United States Patent
Kwon et al.

(10) Patent No.: US 12,224,419 B2
(45) Date of Patent: Feb. 11, 2025

(54) BATTERY MODULE HAVING STRUCTURE INTO WHICH COOLING WATER CAN BE INTRODUCED WHEN THERMAL RUNAWAY PHENOMENON OCCURS, AND BATTERY PACK AND ENERGY STORAGE DEVICE COMPRISING SAME

(71) Applicant: LG ENERGY SOLUTION, LTD., Seoul (KR)

(72) Inventors: Min-Ho Kwon, Daejeon (KR); Jae-Uk Ryu, Daejeon (KR); Jeong Bin Yu, Daejeon (KR); Jin-Hak Kong, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 443 days.

(21) Appl. No.: 17/625,561

(22) PCT Filed: Jul. 3, 2020

(86) PCT No.: PCT/KR2020/008737
§ 371 (c)(1),
(2) Date: Jan. 7, 2022

(87) PCT Pub. No.: WO2021/006560
PCT Pub. Date: Jan. 14, 2021

(65) Prior Publication Data
US 2022/0294052 A1    Sep. 15, 2022

(30) Foreign Application Priority Data

Jul. 8, 2019 (KR) .................. 10-2019-0082288

(51) Int. Cl.
*H01M 10/6567* (2014.01)
*A62C 2/06* (2006.01)
(Continued)

(52) U.S. Cl.
CPC .......... *H01M 10/6567* (2015.04); *A62C 2/06* (2013.01); *A62C 3/16* (2013.01); *H01M 10/4257* (2013.01);
(Continued)

(58) Field of Classification Search
CPC ............. H01M 50/502; H01M 50/204; H01M 10/6567; H01M 10/613; H01M 10/63;
(Continued)

(56) References Cited

U.S. PATENT DOCUMENTS

| 2011/0045326 A1 | 2/2011 | Leuthner et al. |
| 2015/0132670 A1 | 5/2015 | Nagayama et al. |

(Continued)

FOREIGN PATENT DOCUMENTS

| CN | 106571503 A | 4/2017 |
| CN | 109546261 A | 3/2019 |

(Continued)

OTHER PUBLICATIONS

Extended European Search Report for European Application No. 20837142.7, dated Oct. 13, 2022.
(Continued)

*Primary Examiner* — Karie O'Neill Apicella
(74) *Attorney, Agent, or Firm* — Birch, Stewart, Kolasch & Birch, LLP

(57) ABSTRACT

A battery module includes a plurality of battery cells, a module housing in which a cell stack is received, the cell stack being formed by stacking the plurality of battery cells, an air inlet passing through the module housing on one side of a stack direction of the cell stack, an air outlet passing through the module housing on the other side in the stack direction of the cell stack, and an expandable pad disposed inside of the air inlet and the air outlet to close the air inlet (Continued)

and the air outlet by expansion upon contact with cooling water introduced into the battery module.

12 Claims, 11 Drawing Sheets

(51) Int. Cl.
  *A62C 3/16* (2006.01)
  *H01M 10/42* (2006.01)
  *H01M 10/48* (2006.01)
  *H01M 10/613* (2014.01)
  *H01M 10/63* (2014.01)
  *H01M 10/6562* (2014.01)
  *H01M 50/204* (2021.01)
  *H01M 50/502* (2021.01)

(52) U.S. Cl.
  CPC ....... *H01M 10/482* (2013.01); *H01M 10/486* (2013.01); *H01M 10/613* (2015.04); *H01M 10/63* (2015.04); *H01M 10/6562* (2015.04); *H01M 50/204* (2021.01); *H01M 50/502* (2021.01); *H01M 2010/4271* (2013.01); *H01M 2200/10* (2013.01)

(58) Field of Classification Search
  CPC ......... H01M 10/6562; H01M 10/4257; H01M 10/482; H01M 10/486
  See application file for complete search history.

(56) References Cited

U.S. PATENT DOCUMENTS

| | | |
|---|---|---|
| 2015/0229010 A1 | 8/2015 | Ahn |
| 2016/0093842 A1 | 3/2016 | Blanco et al. |
| 2017/0200993 A1* | 7/2017 | Song ................. H01M 10/0525 |
| 2021/0249712 A1 | 8/2021 | Lee et al. |

FOREIGN PATENT DOCUMENTS

| | | | | |
|---|---|---|---|---|
| CN | 110212132 A | * | 9/2019 | ........... B01D 53/261 |
| CN | 209859997 U | | 12/2019 | |
| EP | 2 843 727 A1 | | 3/2015 | |
| EP | 2 851 973 A1 | | 3/2015 | |
| EP | 3 840 109 A1 | | 6/2021 | |
| JP | 2010-277875 A | | 12/2010 | |
| JP | 5200119 B2 | | 5/2013 | |
| JP | 2013-131416 A | | 7/2013 | |
| JP | 2013-229180 A | | 11/2013 | |
| JP | 3187696 U | | 12/2013 | |
| JP | 2014-183010 A | | 9/2014 | |
| JP | 2014-216248 A | | 11/2014 | |
| JP | 2015-141833 A | | 8/2015 | |
| JP | 2015153616 A | * | 8/2015 | .......... H01M 10/613 |
| JP | 5953925 B2 | | 7/2016 | |
| JP | 6041252 B2 | | 12/2016 | |
| JP | 2018-098074 A | | 6/2018 | |
| JP | 2018-133134 A | | 8/2018 | |
| JP | 2019-29126 A | | 2/2019 | |
| JP | 7179150 B2 | | 11/2022 | |
| KR | 10-2015-0094030 A | | 8/2015 | |
| KR | 10-2017-0012482 A | | 2/2017 | |
| KR | 10-2017-0084606 A | | 7/2017 | |
| KR | 10-2018-0007241 A | | 1/2018 | |
| KR | 10-2019-0009634 A | | 1/2019 | |

OTHER PUBLICATIONS

International Search Report (PCT/ISA/210) issued in PCT/KR2020/008737 mailed on Oct. 26, 2020.

* cited by examiner

BATTERY MODULE HAVING STRUCTURE INTO WHICH COOLING WATER CAN BE INTRODUCED WHEN THERMAL RUNAWAY PHENOMENON OCCURS, AND BATTERY PACK AND ENERGY STORAGE DEVICE COMPRISING SAME

TECHNICAL FIELD

The present disclosure relates to a battery module having a structure for cooling water introduction when thermal runaway occurs, and a battery pack and an energy storage system comprising the same, and more particularly, to a battery module in which when thermal runaway is detected from a certain battery module in a battery pack including a plurality of battery modules, cooling water is introduced into the corresponding battery module to prevent the thermal runaway from propagating to adjacent battery modules, and a battery pack and an energy storage system comprising the same.

The present application claims the benefit of Korean Patent Application No. 10-2019-0082288 filed on Jul. 8, 2019 with the Korean Intellectual Property Office, the disclosure of which is incorporated herein by reference in its entirety.

BACKGROUND ART

In a battery module including a plurality of battery cells, when a failure such as a short circuit occurs in a certain battery cell and the temperature of the battery cell exceeds the critical temperature, thermal runaway occurs. When thermal runaway occurs, the safety issue may arise.

When thermal runaway occurred in a certain battery cell results in flames, the temperature of adjacent battery cells rapidly increases, leading to thermal runaway propagation in a short time.

When it fails to quickly cope with the thermal runaway occurred in the battery cell, a catastrophe such as fire and explosion may occur to the battery module or a battery pack having larger capacity than the battery cell, causing economic damage and safety problem.

Accordingly, when flames occur in a certain battery cell within a battery module due to thermal runaway, it is important to quickly lower the internal temperature of the battery module to prevent the flames from spreading.

In addition, in case that the battery module adopts an air-cooled structure, even if cooling water is introduced to lower the internal temperature of the battery module and put out the flames, the cooling water does not stay inside and may leak out of air channels. Accordingly, there is a need to develop a battery pack structure for blocking the air channels when cooling water is introduced into the battery module in which the thermal runaway occurred.

DISCLOSURE

Technical Problem

The present disclosure is designed to solve the above-described problem, and therefore the present disclosure is aimed at preventing flames from spreading by quickly lowering the internal temperature of a battery module when thermal runaway occurs in a certain battery cell within the battery module and results in flames.

The technical problem to be solved is not limited to the above-described problem, and other problems not mentioned herein will be clearly understood by those skilled in the art from the following description.

Technical Solution

To solve the above-described problem, a battery module according to an embodiment of the present disclosure includes a cell stack comprising a plurality of battery cells, a module housing in which the cell stack is received, an air inlet passing through the module housing on a first side of a stack direction of the cell stack, an air outlet passing through the module housing on a second side in the stack direction of the cell stack, and an expandable pad disposed inside of the air inlet and the air outlet to close the air inlet and the air outlet by expansion upon contact with cooling water introduced into the module housing.

The expandable pad may be attached to an inner surface of the module housing.

A pair of expandable pads may be provided, and the pair of expandable pads may be attached to an upper inner surface and a lower inner surface of the module housing respectively.

At least part of the expandable pad may be inserted into a receiving groove formed in an inner surface of the module housing.

The battery module may include a mesh plate disposed on each of two sides of the expandable pad to guide movement for expansion of the expandable pad.

The battery module may include a pair of busbar frames coupled to a first side and a second side in a widthwise direction of the cell stack respectively.

The air inlet and the air outlet may be formed at locations corresponding to an empty space between the busbar frames and the module housing.

A battery pack according to an embodiment of the present disclosure includes a pack housing, a module stack comprising a plurality of battery modules in the pack housing, a water tank disposed on a module stack to store cooling water, a cooling water pipe connecting the water tank to the battery modules, at least one sensor installed in the pack housing to detect thermal runaway occurring in a certain battery module among the plurality of battery modules, and a controller to output a control signal to introduce the cooling water into the certain battery module through the cooling water pipe when the thermal runaway is detected by the sensor.

The battery pack may include a plurality of valves installed in the cooling water pipe, and each of the plurality of valves may be installed adjacent to a respective one of the plurality of battery modules to individually allow or block a flow of the cooling water introduced into the plurality of battery modules.

The sensor may be installed in each of the plurality of battery modules.

The controller may output a control signal to open a valve installed adjacent to the certain battery module in which the thermal runaway is detected by the sensor among the plurality of valves.

An energy storage system according to an embodiment of the present disclosure includes a plurality of battery packs according to an embodiment of the present disclosure.

Advantageous Effects

According to an aspect of the present disclosure, it is possible to prevent flames from spreading by quickly lowering the internal temperature of a battery module when thermal runaway occurs in a certain battery cell within the battery module and results in flames.

In addition, according to another aspect of the present disclosure, a battery pack including air-cooled battery modules can effectively prevent thermal runaway propagation by applying a structure for blocking air channels for cooling to allow cooling water to stay inside when the cooling water is introduced into a battery module in which thermal runaway occurred.

BRIEF DESCRIPTION OF THE DRAWINGS

The accompanying drawings illustrate preferred embodiments of the present disclosure and, together with the foregoing disclosure, serve to provide further understanding of the technical spirit of the present disclosure. However, the present disclosure is not to be construed as being limited to the drawings.

DETAILED DESCRIPTION

Figure 1:
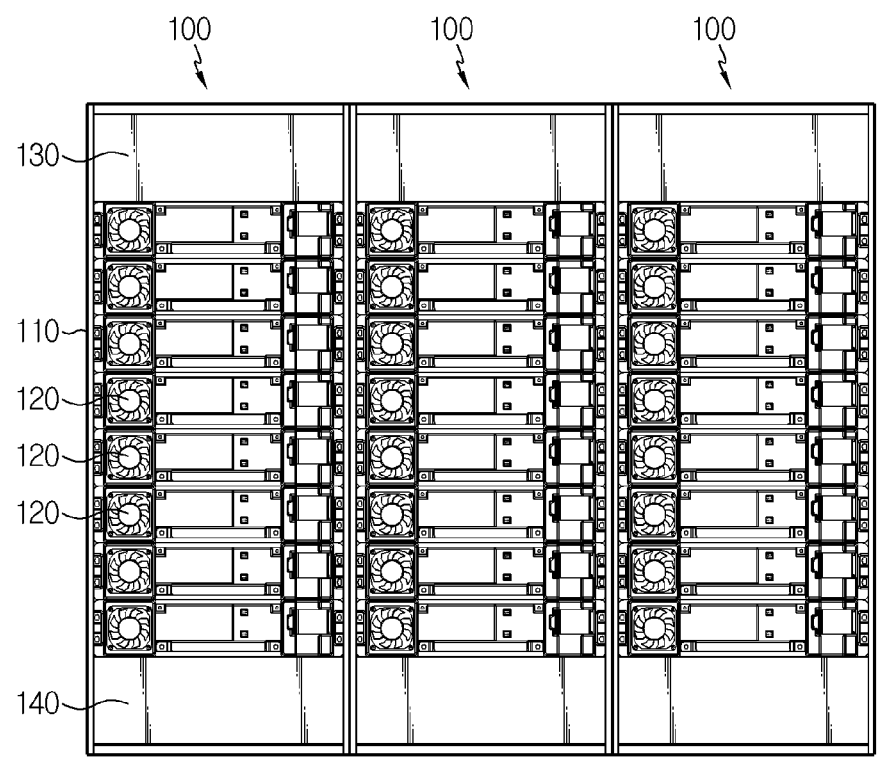
FIG. 1 is a diagram showing an energy storage system according to an embodiment of the present disclosure.

Hereinafter, the preferred embodiments of the present disclosure will be described in detail with reference to the accompanying drawings. Prior to the description, it should be understood that the terms or words used in the specification and the appended claims should not be construed as being limited to general and dictionary meanings, but rather interpreted based on the meanings and concepts corresponding to the technical aspects of the present disclosure on the basis of the principle that the inventor is allowed to define the terms appropriately for the best explanation. Therefore, the embodiments described herein and illustrations shown in the drawings are just some preferred embodiment of the present disclosure, but not intended to fully describe the technical aspects of the present disclosure, so it should be understood that a variety of other equivalents and modifications could have been made thereto at the time that the application was filed.

Referring to FIG. 1, an energy storage system according to an embodiment of the present disclosure includes a plurality of battery packs 100 according to an embodiment of the present disclosure.

Figure 2:
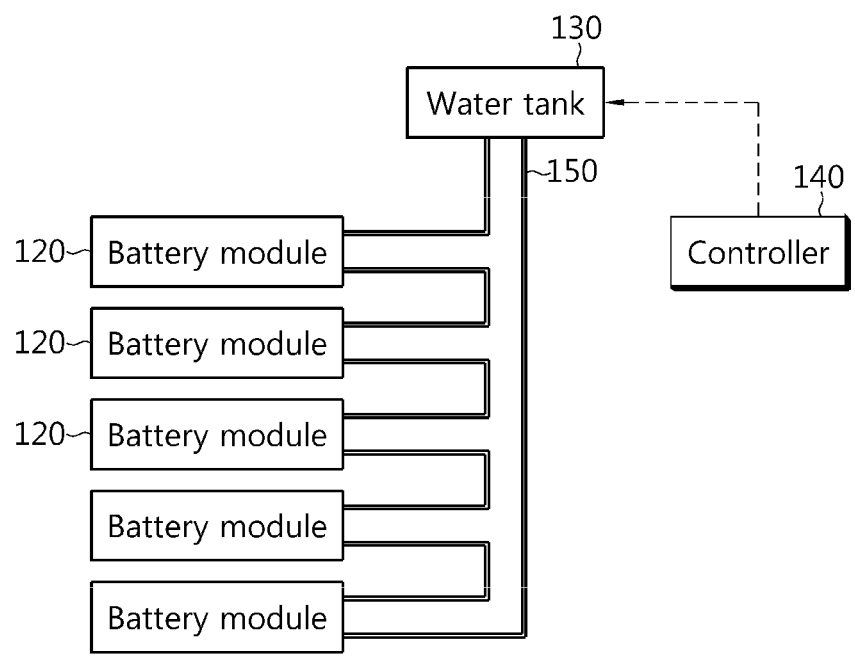
FIG. 2 is a diagram illustrating a connection structure between a water tank and battery modules and a relationship between the water tank and a controller in a battery pack according to an embodiment of the present disclosure.
Figure 3:
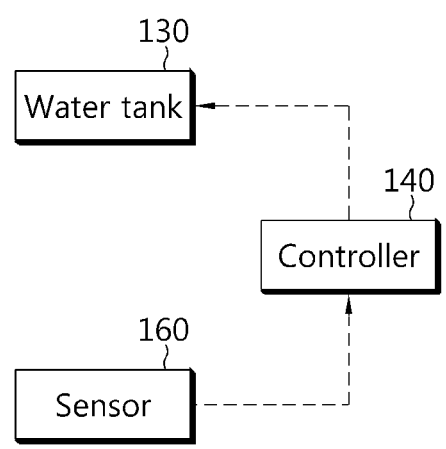
FIG. 3 is a diagram illustrating a relationship between a sensor, a controller and a water tank in a battery pack according to an embodiment of the present disclosure.

Referring to FIGS. 1 to 3, the battery pack 100 according to an embodiment of the present disclosure includes a pack housing 110, a battery module 120, a water tank 130, a controller 140, a cooling water pipe 150 and a sensor 160.

The pack housing 110 is an approximately rectangular frame defining the shape of the battery pack 100, and has a space in which a plurality of battery modules 120, the water tank 130, the controller 140, the cooling water pipe 150 and the sensor 160 are installed.

The plurality of battery modules 120 is provided, and the plurality of battery modules 120 is stacked on top of each other within the pack housing 110 to form a module stack. The detailed structure of the battery module 120 will be described in detail below with reference to FIGS. 4 to 7.

The water tank 130 is provided in the pack housing 110 to store cooling water to be supplied to the battery module 120 when thermal runaway occurs in the battery module 120. The water tank 130 may be disposed on the module stack for quick and good supply of cooling water. In this case, cooling water may be supplied to the battery module 120 quickly by a free fall and cooling water pressure without using a separate cooling water pump. For quicker and better supply of cooling water, a separate cooling water pump may be applied to the water tank 130.

The controller 140 may be connected to the sensor 160 and the water tank 130 to output a control signal for opening the water tank 130 in response to a sensing signal from the sensor 160. In addition to this function, the controller 140 may function as a battery management system (BMS) connected to each of the battery modules 120 to manage the charge/discharge.

When gas or a temperature rise above a reference value is detected in the battery pack 100 due to thermal runaway occurred in at least one of the plurality of battery modules 120, the controller 140 outputs a control signal for opening the water tank 130 to supply cooling water to the battery module 120.

When the water tank 130 is open by the control signal of the controller 140, the cooling water is supplied in a sequential order from the top battery module 120 to the bottom battery module 120. Accordingly, it is possible to put out the flames in the battery module 120 and cool down the battery module 120, thereby preventing the thermal runaway from propagating to the entire battery pack 100.

The cooling water pipe 150 connects the water tank 130 to the battery module 120 and acts as a passage to transport the cooling water supplied from the water tank 130 to the battery module 120. To perform this function, one end of the cooling water pipe 150 is connected to the water tank, and the other end is divided into the number of branches corresponding to the number of battery modules 120, each branch connected to each of the plurality of battery modules 120.

As described above, when thermal runaway occurs in at least some of the plurality of battery modules 120, the sensor 160 senses an increase in temperature and/or gas generation, and transmits a sensing signal to the controller 140. To perform this function, the sensor 160 may be a temperature sensor or a gas detection sensor, and a combination thereof.

The sensor 160 is installed in the pack housing 110 to detect an increase in the internal temperature or gas generation in the battery pack 100. The sensor 160 may be attached to the inner or outer side of each of the plurality of battery modules 120 to quickly sense the temperature of the battery module 120 and/or gas generated from the battery module 120.

The battery module 120 applied to the battery pack 100 according to an embodiment of the present disclosure will be described in more detail below with reference to FIGS. 4 to 7.

Referring to FIGS. 4 to 7, the battery module 120 includes a plurality of battery cells 121, a busbar frame 122, a module housing 123, an air inlet 124, an air outlet 125 and an expandable pad 126.

The plurality of battery cells 121 is provided, and the plurality of battery cells 121 is stacked to form a cell stack. The battery cell 121 may include, for example, a pouch type battery cell. The battery cell 121 has a pair of electrode leads 121*a* extending on two sides in the lengthwise direction respectively.

A pair of busbar frames 122 are provided, and the busbar frames 122 cover one side and the other side in the widthwise direction of the cell stack (the direction in which the electrode leads are formed) respectively. The electrode leads 121*a* of the battery cell 121 extend through slits formed in the busbar frames 122, and they are bent and fixed onto the busbar frames 122 by welding. That is, the plurality of battery cells 121 may be electrically connected by the busbar frames 122.

The module housing 123 has a substantially rectangular parallelepiped shape, and receives the cell stack inside. The air inlet 124 and the air outlet 125 are formed on one side and the other side in the lengthwise direction of the module housing 123.

When the battery pack 100 of the present disclosure of FIG. 1 is viewed from the front side, the air inlet 124 is formed on one side (front side) in the stack direction of the cell stack, i.e., one side in the lengthwise direction of the battery module 120. The air inlet 124 is formed in the shape of a hole passing through the module housing 123. The air outlet 125 is formed on the other side (rear side) in the stack direction of the cell stack, i.e., the other side in the lengthwise direction of the battery module 120. The air outlet 125 is formed in the shape of a hole passing through the module housing 123.

The air inlet 124 and the air outlet 125 are disposed on the opposite sides diagonally across the battery module 120 along the lengthwise direction (the stack direction of the cell stack).

Meanwhile, an empty space is formed between the busbar frames 122 and the module housing 123. That is, an empty space in which air for cooling the battery cells 121 flows is formed between the busbar frames 122 and the surfaces corresponding to one side and the opposite side in the lengthwise direction of the battery cell 121 among the six outer sides of the module housing 123. The empty space is formed on each of the two sides in the widthwise direction of the battery module 120.

The air inlet 124 is formed at a location corresponding to the empty space formed on one side in the widthwise direction of the battery module 120, and the air outlet 125 is formed at a location corresponding to the empty space formed on the other side in the widthwise direction of the battery module 120.

In the battery module 120, air introduced through the air inlet 124 exits the air outlet 125 after cooling down the battery cell 121 while moving from the empty space formed on one side in the widthwise direction of the battery module 120 to the empty space formed on the other side in the widthwise direction of the battery module 120. That is, the battery module 120 is of an air-cooled type.

The cooling water pipe 150 is in communication with the empty space formed between the busbar frames 122 and the module housing 123 through the module housing 123 from one side or the other side in the stack direction of the cell stack. That is, the cooling water pipe 150 may be inserted through the same surface as the surface in which the air inlet 124 is formed or the surface in which the air outlet 125 is formed among the six surfaces of the module housing 123.

Figure 4:
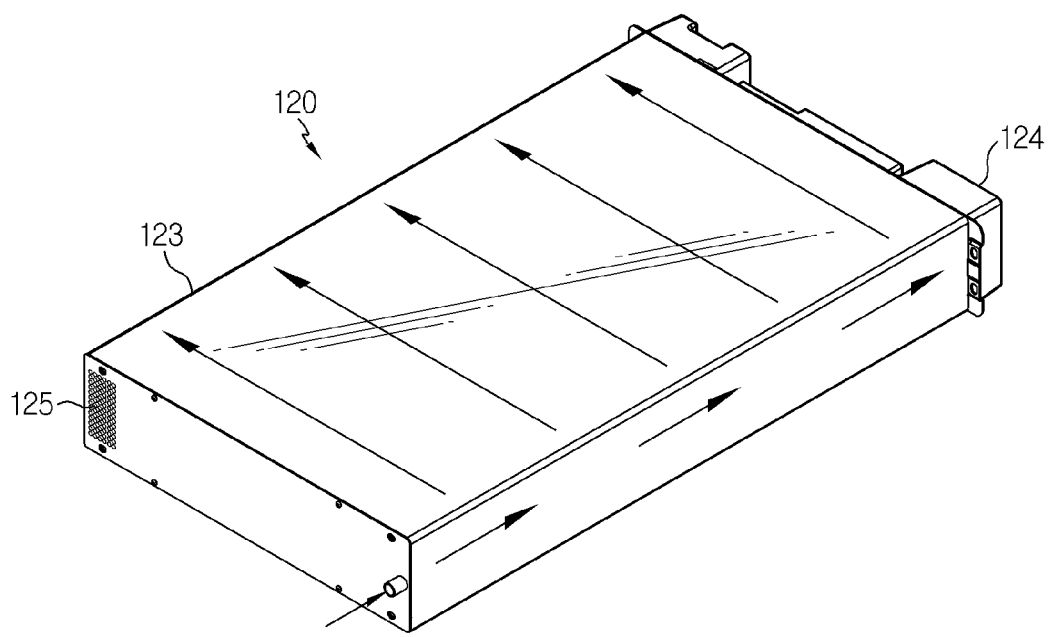
FIGS. 4 and 5 are perspective views showing a battery module that is applied to a battery pack according to an embodiment of the present disclosure.
Figure 5:
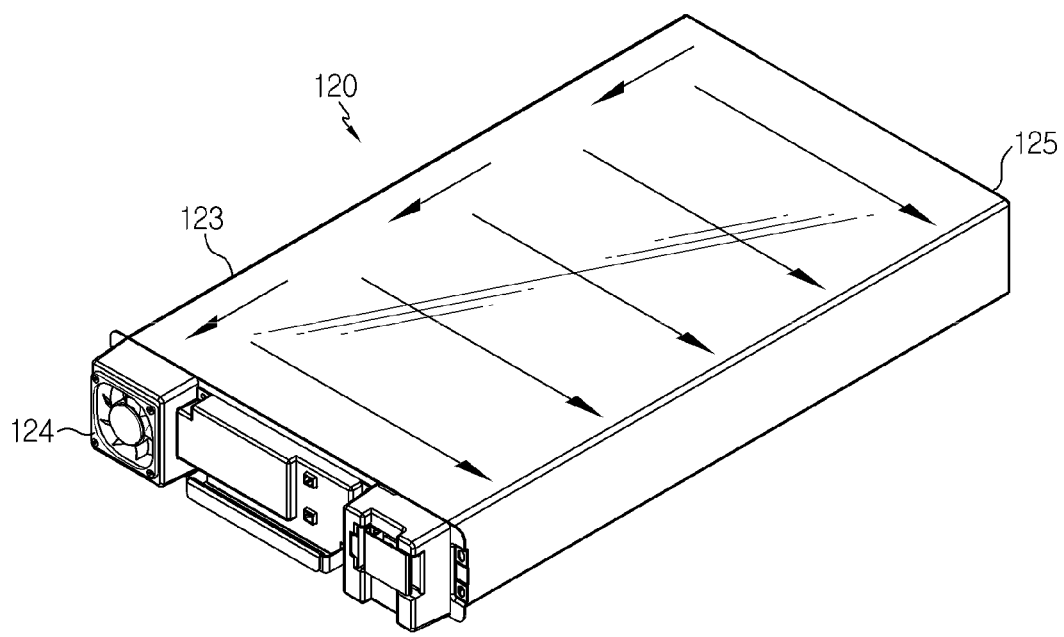
Figure 6:
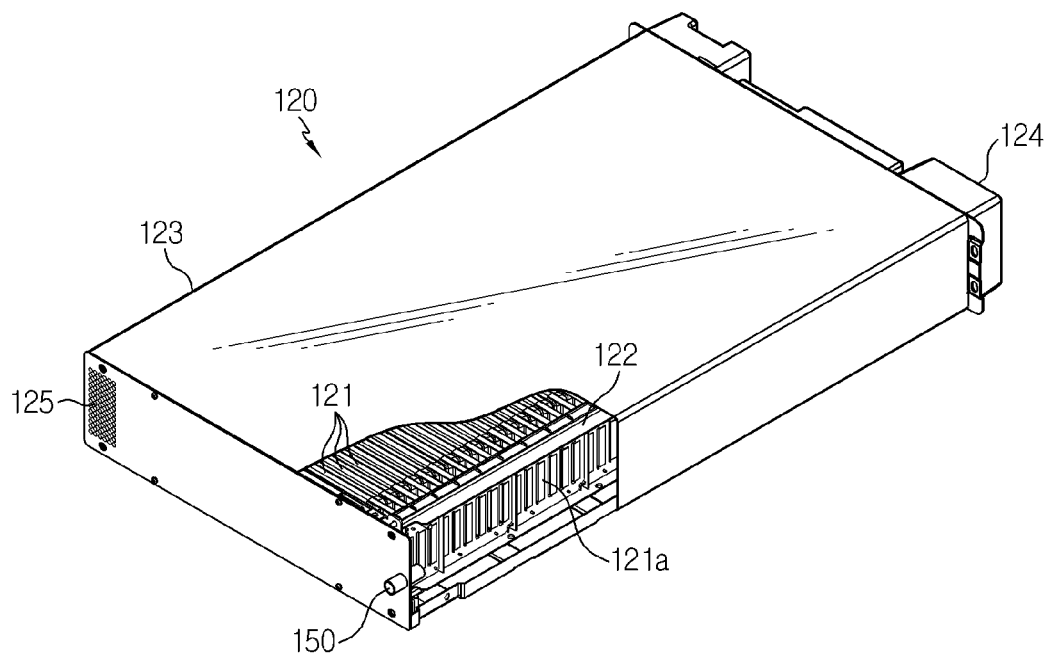
FIG. 6 is a diagram showing an internal structure of a battery module that is applied to a battery pack according to an embodiment of the present disclosure.

Accordingly, cooling water introduced into the battery module 120 through the cooling water pipe 150 flows from the empty space formed on one side in the widthwise direction of the battery module 120 to the empty space formed on the other side in the widthwise direction of the battery module 120 as shown in FIGS. 4 and 5, and the battery module 120 is filled with the cooling water.

Figure 7:
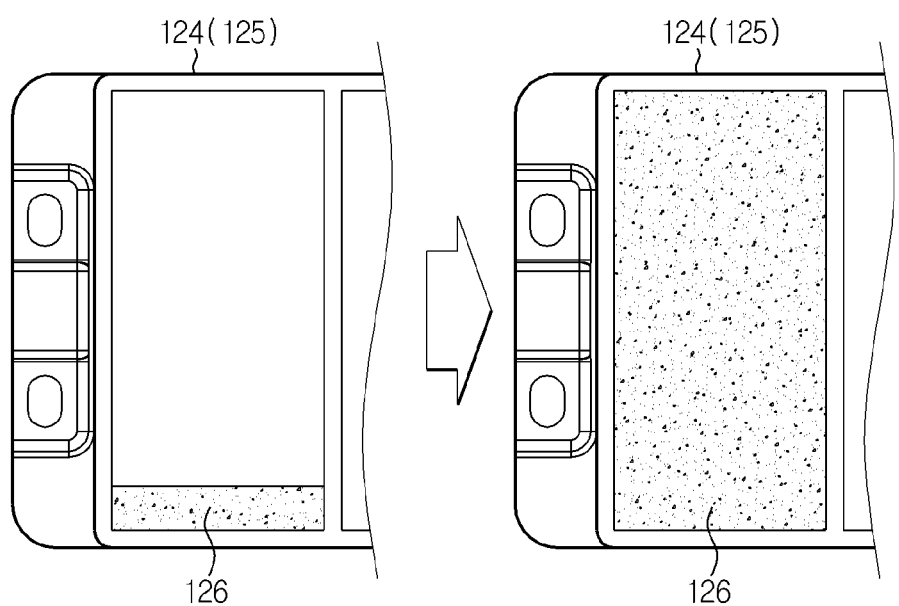
FIG. 7 is a partial front view of a battery module that is applied to a battery pack according to an embodiment of the present disclosure, showing an expandable pad disposed in the battery module.

Referring to FIG. 7, the expandable pad 126 is disposed inside of the air inlet 124 and the air outlet 125. The expandable pad 126 is attached to the inner surface of the module housing 123, and having a size smaller than the open area of the air inlet 124 and the air outlet 125. To improve the air flow through the air inlet 124 and the air outlet in the normal condition of the battery module 120, the expandable pad 126 preferably has a size of less than about 30% of the open area of the air inlet 124 and the air outlet 125. Although FIG. 7 shows that the expandable pad 126 is attached to the bottom of the module housing 123, the expandable pad 126 may be attached to the top or the side of the module housing 123.

The expandable pad 126 expands when it contacts cooling water introduced into the battery module 120, and the air inlet 124 and the air outlet 125 are closed by the expansion of the expandable pad 126. The expandable pad 126 contains resin that exhibits a very large expansion rate when the resin absorbs moisture, and when a sufficient amount of moisture is provided, the volume of the resin is larger at least two times than the initial volume. The resin used for the expandable pad 126 may include, for example, a nonwoven fabric formed from a mixture of super absorbent fibers (SAFs) and polyester staple fibers. The SAF is a fiber made of super absorbent polymer (SAP).

The closing of the air inlet 124 and the air outlet 125 by the expansion of the expandable pad 126 is not necessarily limited to complete closure of the inlet 124 and the air outlet 125 to prevent cooling water leaks, and encompasses a reduction in the open area of the inlet 124 and the air outlet 125 to reduce cooling water leaks.

By the use of the expandable pad 126, when cooling water is introduced into the battery module 120 in the event that thermal runaway occurs in at least some of the battery modules 120, the air inlet 124 and the air outlet 125 are closed. When the air inlet 124 and the air outlet 125 are closed, the cooling water introduced into the battery module 120 does not leak and stays in the battery module 120, thereby quickly solving the problem of thermal runaway occurred in the battery module 120.

Figure 8:
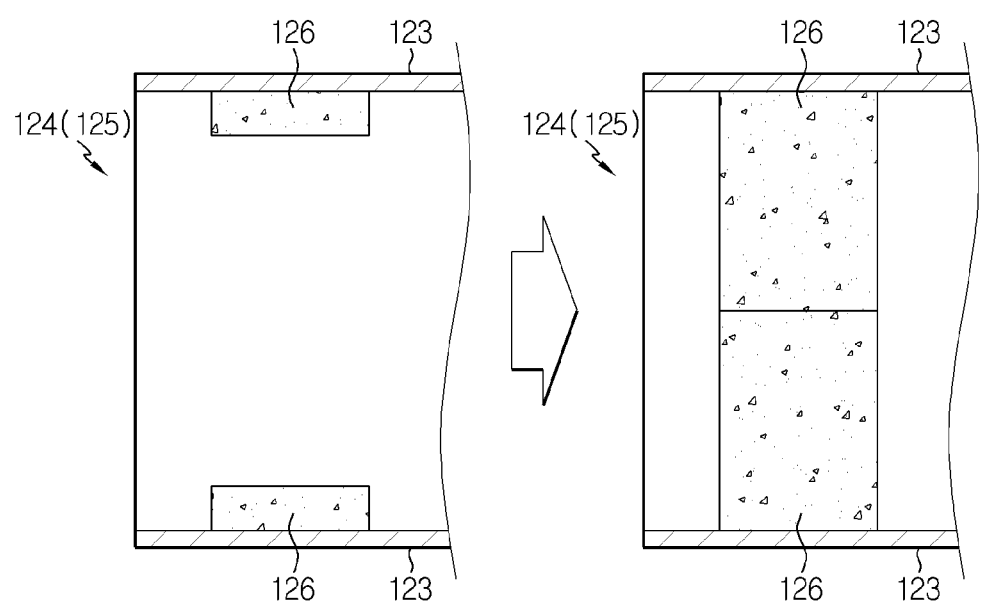
FIGS. 8 to 10 are partial cross-sectional views of a battery module that is applied to a battery pack according to an embodiment of the present disclosure when viewed from the side, showing an expandable pad disposed in the battery module.

Referring to FIG. 8, a pair of expandable pads 126 may be provided, and in this case, the pair of expandable pads 126 are attached to the upper and lower inner surfaces of the module housing 123 respectively. The pair of expandable pads 126 are attached at matching locations to close the air inlet 124 and the air outlet 125 when they come into contact with each other by expansion.

Figure 9:
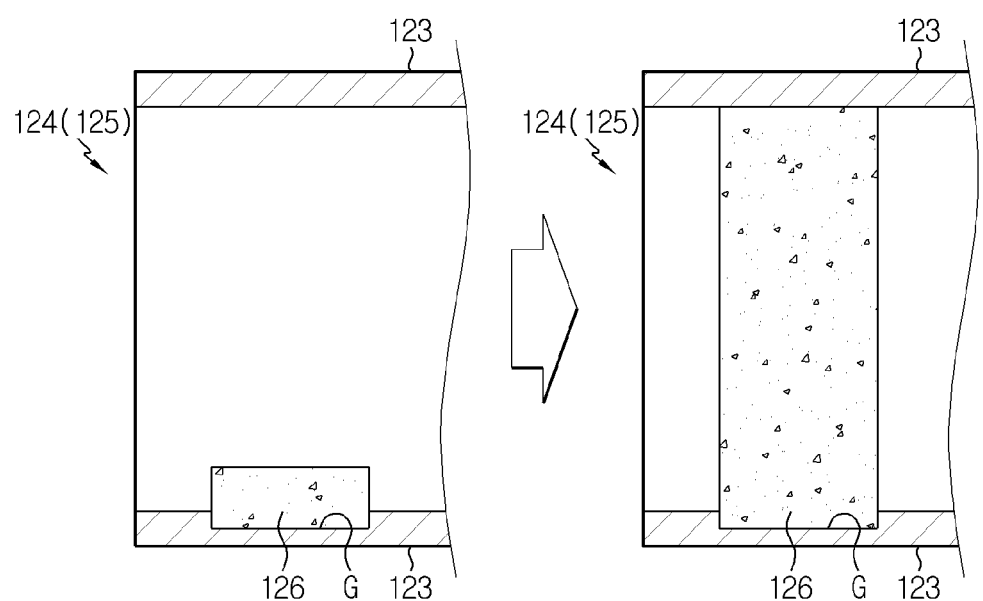

Referring to FIG. 9, at least part of the expandable pad 126 may be inserted and fixed into a receiving groove G formed at a predetermined depth in the inner surface of the module housing 123.

Figure 10:
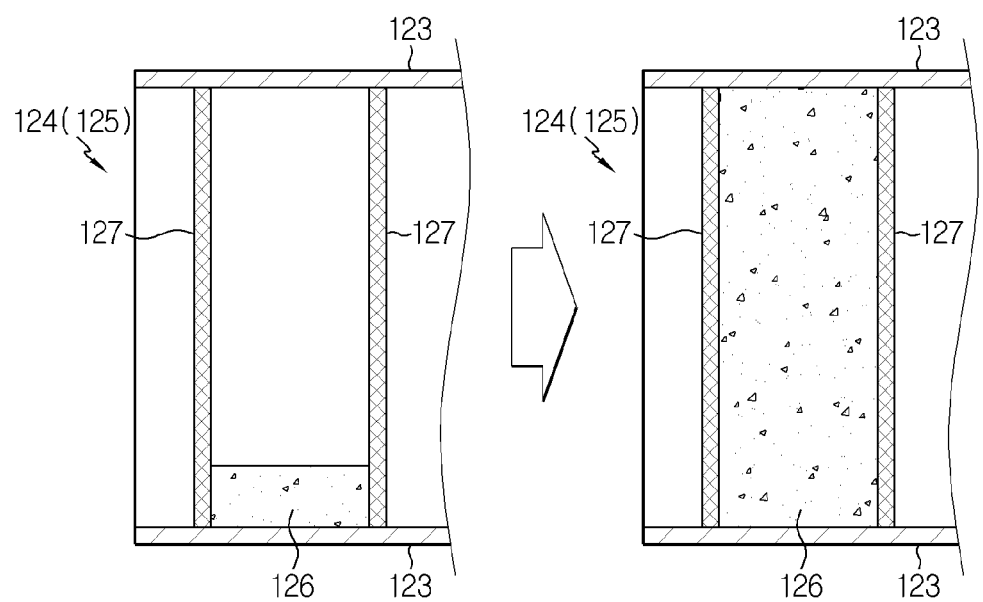

Referring to FIG. 10, when the expandable pad 126 expands upon moisture absorption, movement for expansion may be guided by a pair of mesh plates 127 disposed on two sides respectively. The mesh plate 127 is a mesh type plate having a structure that allows air and cooling water to pass therethrough in a non-expanded condition of the expandable pad 126.

Figure 11:
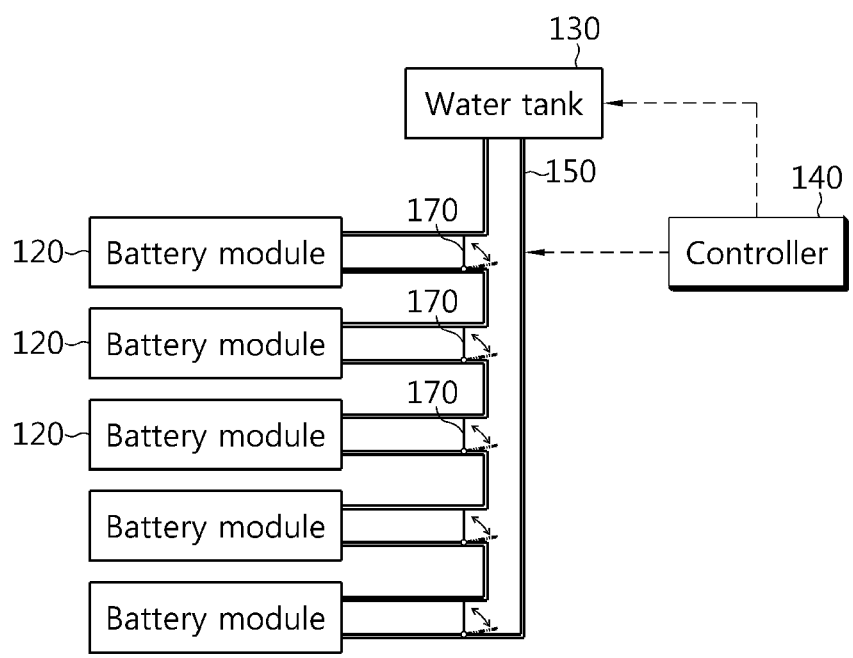
FIG. 11 is a diagram illustrating a connection structure between a water tank and battery modules, and a relationship between valves, a controller and the water tank in a battery pack according to another embodiment of the present disclosure.

A battery pack according to another embodiment of the present disclosure will be described below with reference to FIG. 11.

The battery pack according to another embodiment of the present disclosure is substantially the same as the battery pack 100 according to an embodiment of the present disclosure as described above, but only different in valves 170 installed in the cooling water pipe 150.

Accordingly, in describing the battery pack according to another embodiment of the present disclosure, a detailed description of the valves 170 is provided below, and redundant descriptions are omitted herein.

The plurality of valves 170 corresponding to the number of battery modules 120 is provided, and each valve 170 is installed adjacent to the plurality of battery modules 120 to individually allow or block the flow of cooling water introduced into the plurality of battery modules 120.

To independently operate the plurality of valves 170, at least one sensor 160 is provided for each battery module 120. When the sensor 160 is provided for each battery module 120, it is possible to introduce cooling water into only the battery module 120 in which thermal runaway occurred.

That is, when the controller 140 receives a detection signal from a certain sensor 160, the controller 140 determines that thermal runaway occurred in the battery module 120 to which the sensor 160 having transmitted the detection signal is attached, and opens the valve 170 installed adjacent to the battery module 120 in which thermal runaway occurred among the plurality of valves 170 to introduce cooling water into the battery module 120.

As described above, in the battery pack according to the present disclosure, when thermal runaway occurs in the battery module 120, cooling water is introduced into the battery module 120, thereby preventing the thermal runaway from propagating to adjacent battery modules 120. Particularly, in the battery pack according to the present disclosure, when cooling water is introduced into the air-cooled battery module 120, the air inlet 124 and the air outlet 125 are closed to fill the battery module 120 with cooling water, thereby preventing thermal runaway propagation more effectively.

While the present disclosure has been hereinabove described with regard to a limited number of embodiments and drawings, the present disclosure is not limited thereto and it is obvious to those skilled in the art that various modifications and changes may be made thereto within the technical aspects of the present disclosure and the equivalent scope of the appended claims.

What is claimed is:

1. A battery module comprising:
   a cell stack comprising a plurality of battery cells;
   a module housing in which the cell stack is received;
   an air inlet passing through the module housing on a first side of a stack direction of the cell stack;
   an air outlet passing through the module housing on a second side in the stack direction of the cell stack; and
   at least one expandable pad disposed inside of the air inlet and the air outlet to close the air inlet and the air outlet, by expansion upon contact with cooling water introduced into the module housing thereby preventing the cooling water introduced into the module housing from leaking out of the module housing.

2. The battery module according to claim 1, wherein the at least one expandable pad is attached to an inner surface of the air inlet.

3. The battery module according to claim 1, wherein the at least one expandable pad is a pair of expandable pads are provided, and
   wherein the pair of expandable pads are attached to an inner surface of an upper wall and an inner surface of a lower wall, respectively.

4. The battery module according to claim 1, wherein at least part of the at least one expandable pad is inserted into a receiving groove formed in an inner surface of the module housing.

5. The battery module according to claim 1, wherein the battery module includes a pair of mesh plates fixed to the air inlet, the pair of mesh plates respectively disposed on each of two sides of the at least one expandable pad to guide movement for expansion of the at least one expandable pad.

6. The battery module according to claim 1, wherein the battery module includes a pair of busbar frames coupled to a first side and a second side in a widthwise direction of the cell stack respectively.

7. The battery module according to claim 6, wherein the air inlet and the air outlet are formed at locations corresponding to an empty space between the busbar frames and the module housing.

8. A battery pack comprising:
   a pack housing;
   a module stack comprising a plurality of battery modules according to claim 1, in the pack housing;
   a water tank disposed on the module stack to store cooling water;
   a cooling water pipe connecting the water tank to the battery modules;
   at least one sensor installed in the pack housing to detect thermal runaway occurring in a certain battery module among the plurality of battery modules; and
   a controller to output a control signal to introduce the cooling water into the certain battery module through the cooling water pipe when the thermal runaway is detected by the sensor.

9. The battery pack according to claim 8, wherein the battery pack includes a plurality of valves installed in the cooling water pipe, and
   wherein each of the plurality of valves is installed adjacent to a respective one of the plurality of battery modules to individually allow or block a flow of the cooling water introduced into the plurality of battery modules.

10. The battery pack according to claim 9, wherein the sensor is installed in each of the plurality of battery modules.

11. The battery pack according to claim 10, wherein the controller outputs a control signal to open a valve installed adjacent to the certain battery module in which the thermal runaway is detected by the sensor among the plurality of valves.

12. An energy storage system comprising a plurality of battery packs according to claim 8.

* * * * *